(12) United States Patent
Tsuruyama et al.

(10) Patent No.: US 9,618,753 B2
(45) Date of Patent: Apr. 11, 2017

(54) DISPLAY DEVICE

(71) Applicant: KABUSHIKI KAISHA TOSHIBA, Minato-ku, Tokyo (JP)

(72) Inventors: Tomoya Tsuruyama, Kanagawa (JP); Shimpei Sawada, Kanagawa (JP); Akihisa Moriya, Kanagawa (JP); Aira Hotta, Kanagawa (JP); Yoshiyuki Kokojima, Kanagawa (JP); Masahiro Baba, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 25 days.

(21) Appl. No.: 14/645,567

(22) Filed: Mar. 12, 2015

(65) Prior Publication Data
US 2015/0338662 A1  Nov. 26, 2015

(30) Foreign Application Priority Data

May 20, 2014  (JP) ................. 2014-104390

(51) Int. Cl.
*G02B 27/01* (2006.01)
*G06F 3/01* (2006.01)
(Continued)

(52) U.S. Cl.
CPC ..... *G02B 27/0176* (2013.01); *G02B 27/0172* (2013.01); *G02C 11/10* (2013.01);
(Continued)

(58) Field of Classification Search
None
See application file for complete search history.

(56) References Cited

U.S. PATENT DOCUMENTS

2004/0252077 A1   12/2004  Terasaki
2006/0209268 A1*  9/2006   Raskar ................... G03B 21/14
                                                                  353/69
(Continued)

FOREIGN PATENT DOCUMENTS

JP   2002-162597   6/2002
JP   2003-046903   2/2003
(Continued)

OTHER PUBLICATIONS

Japanese Office Action for Japanese Patent Application No. 2014-104390 mailed on Nov. 4, 2015.
(Continued)

*Primary Examiner* — Michael Teitelbaum
(74) *Attorney, Agent, or Firm* — Amin, Turocy & Watson LLP

(57) ABSTRACT

According to one embodiment, a display device includes a position controller, a projection unit, and a reflector. The projection unit emits light including image information. The projection unit is held by a holder. The position controller is interposed between the holder and the projection unit. The reflector reflects at least a portion of the light emitted from the projection unit. The reflector is held by the holder. A position of the reflector with respect to the holder is fixed. A relative arrangement of the projection unit and the reflector is changeable by the position controller.

20 Claims, 9 Drawing Sheets

(51) Int. Cl.
*H04N 9/31* (2006.01)
*G02C 11/00* (2006.01)
*G03B 21/10* (2006.01)
*G03B 21/28* (2006.01)
*G03B 21/14* (2006.01)

(52) U.S. Cl.
CPC .......... *G03B 21/10* (2013.01); *G03B 21/145* (2013.01); *G03B 21/28* (2013.01); *G06F 3/013* (2013.01); *H04N 9/3179* (2013.01); *G02B 2027/014* (2013.01); *G02B 2027/0159* (2013.01); *G02B 2027/0163* (2013.01); *G02B 2027/0178* (2013.01)

(56) References Cited

U.S. PATENT DOCUMENTS

| | | | |
|---|---|---|---|
| 2007/0064311 A1* | 3/2007 | Park | G02B 27/0172 359/630 |
| 2009/0174946 A1 | 7/2009 | Raviv et al. | |
| 2010/0245757 A1 | 9/2010 | Sugihara et al. | |
| 2011/0221897 A1* | 9/2011 | Haddick | G02B 27/017 348/143 |
| 2012/0206816 A1 | 8/2012 | Yoshida | |
| 2013/0182334 A1 | 7/2013 | Sugihara et al. | |
| 2013/0278497 A1 | 10/2013 | Takagi et al. | |
| 2014/0063473 A1* | 3/2014 | Pasolini | G02B 27/646 353/98 |
| 2015/0331243 A1 | 11/2015 | Sawada et al. | |

FOREIGN PATENT DOCUMENTS

| | | |
|---|---|---|
| JP | 2008009326 | 1/2008 |
| JP | 2010-226660 | 10/2010 |
| JP | 2012-168297 | 9/2012 |
| JP | 2014-035422 | 2/2014 |
| JP | 2015-219405 | 12/2015 |

OTHER PUBLICATIONS

Extended European Search Report for European Patent Application No. 15158773.0 mailed on Oct. 8, 2015.

* cited by examiner

DISPLAY DEVICE

CROSS-REFERENCE TO RELATED APPLICATIONS

This application is based upon and claims the benefit of priority from Japanese Patent Application No. 2014-104390, filed on May 20, 2014; the entire contents of which are incorporated herein by reference.

FIELD

Embodiments described herein relate generally to a display device.

BACKGROUND

There is a display device that includes a display unit that displays an image, a projection unit including a projector that projects the image displayed by the display unit by using multiple optical elements such as lenses and the like, a reflector (a combiner) that reflects the light projected from the projector toward an eye of a viewer, etc. For example, such a display device is used as an eyeglasses-type display device. The reflector is provided as a single body with an eyeglasses lens; and, for example, the relative arrangement of the reflector and an eyeglasses frame is fixed. In the eyeglasses-type display device, the relative position of the reflector with respect to the eye of the viewer may be different between viewers. Therefore, the position of the image as viewed by the viewer may change between viewers. It is desirable to obtain an easily-viewable display in which the position where the image is displayed is adjusted according to the position of the eye of the viewer.

DETAILED DESCRIPTION

Figure 1:
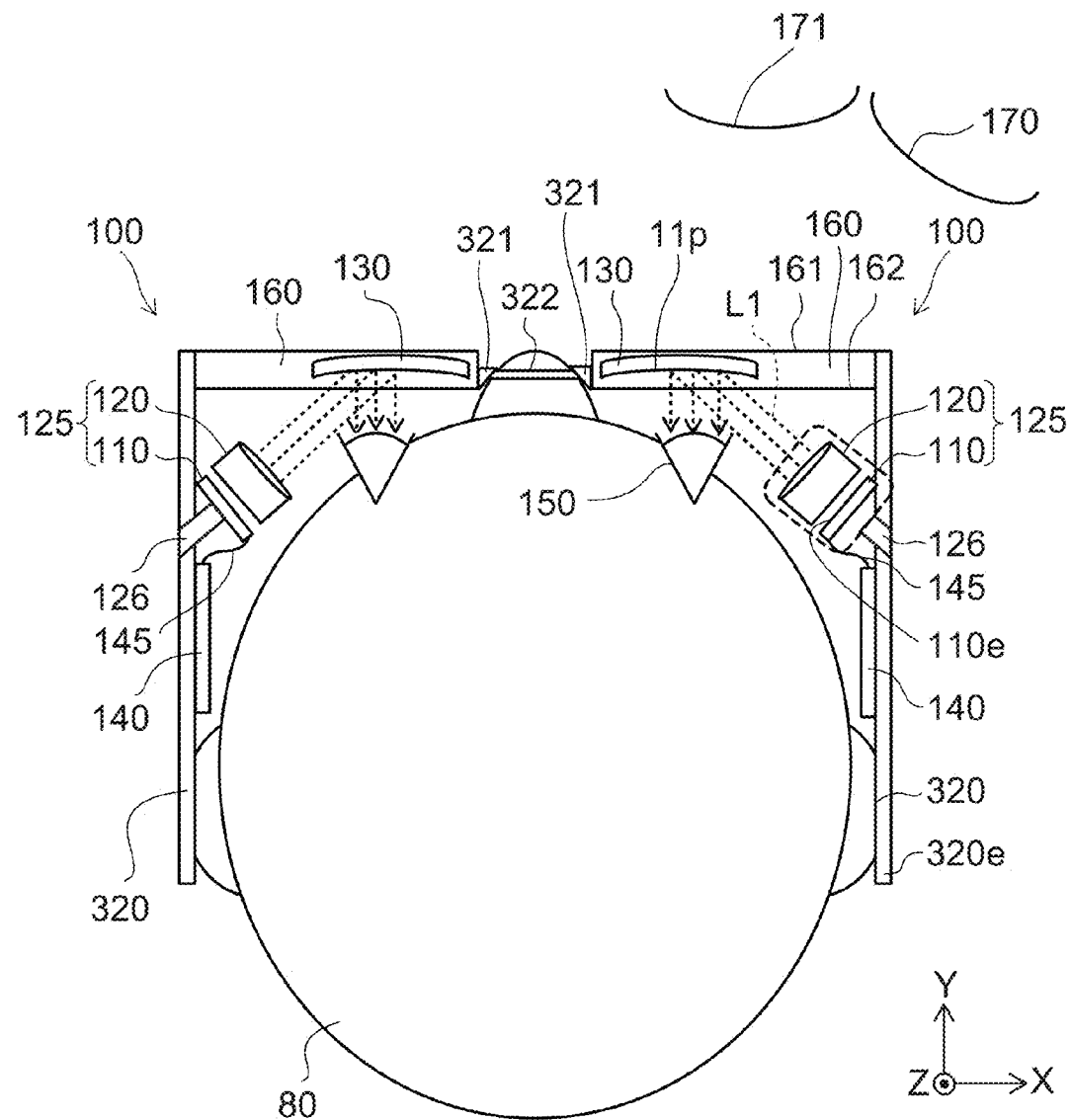
FIG. 1 is a schematic view illustrating a display device according to a first embodiment.

According to one embodiment, a display device includes a position controller, a projection unit, and a reflector. The projection unit emits light including image information. The projection unit is held by a holder. The position controller is interposed between the holder and the projection unit. The reflector reflects at least a portion of the light emitted from the projection unit. The reflector is held by the holder. A position of the reflector with respect to the holder is fixed. A relative arrangement of the projection unit and the reflector is changeable by the position controller.

Embodiments will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

FIG. 1 is a schematic view illustrating a display device according to a first embodiment.

As shown in FIG. 1, the display device 100 includes a projection unit 125, a reflector 130, a circuit unit 140, and a holder 320.

For example, the circuit unit 140 is electrically connected to a display unit 110 by a bendable cable 145. The image information is input to the display unit 110 from the circuit unit 140.

The display unit 110 includes multiple pixels 110e. The multiple pixels 110e are provided to be arranged on a plane. The display unit 110 emits light L1 including image information. The display unit 110 is a display that displays an image. The light that includes the image information is emitted toward an optical unit 120. The display includes, for example, a liquid crystal, organic EL, liquid crystal on silicon, etc. However, the embodiment is not limited thereto.

The optical unit 120 is provided between the display unit 110 and the reflector 130 in the optical path of the light L1 emitted from the multiple pixels 110e of the display unit 110. The optical unit 120 includes at least one optical element. The optical unit 120 is a projector that projects the incident light L1. The optical element may include a lens, a prism, a mirror, etc. For example, the optical unit 120 changes the travel direction of at least a portion of the light L1. Thus, the projection unit 125 emits the light including the image information toward the reflector 130. In the case where multiple optical elements are used, the multiple optical elements may not be disposed on a straight line.

The reflector 130 reflects at least a portion of the light L1 passing through the optical unit 120. For example, the reflector 130 reflects the light passing through the optical unit 120 toward a pupil 150 of a viewer 80. When viewed from the pupil 150, the light that is reflected by the reflector 130 forms an image 171 as a virtual image. Thus, the viewer 80 can view the image.

In the example, the relative arrangement of the display unit 110 and the optical unit 120 is fixed inside the projection unit 125. The relative arrangement of the display unit 110 and the optical unit 120 may be changeable to the extent that the function of projecting the image is not lost. For example, the display unit 110 and the optical unit 120 are mounted inside the projection unit 125 with screws. A configuration may be used in which the relative distance between the display unit 110 and the optical unit 120 and the angle between the display unit 110 and the optical unit 120 can be adjusted by adjusting the tightening amount of the screws. The distance to the virtual image as viewed by the viewer 80 can be changed by adjusting the distance between the display unit 110 and the optical unit 120. For example, an image viewed at 1 m in front of the face can be moved to 2 m in front of the face.

The reflector 130 is, for example, a combiner that transmits a portion of the light incident on the reflector 130 from the external environment. Thereby, the viewer 80 can view the external environment through the reflector 130. The reflector 130 has a first surface 11p. The reflector 130 is provided along the first surface 11p. The first surface 11p is a main surface of the reflector 130. For example, multiple fine reflective surfaces are arranged on the first surface 11p and are used as the reflector 130. The first surface 11p may be a plane or a curved surface. For example, each of the reflective surfaces is a half mirror that reflects at least a portion of the light that is incident. Each of the reflective surfaces is tilted with respect to the first surface 11p; and a jump is formed between the reflective surfaces. The angles between the first surface 11p and the reflective surfaces are determined by the positional relationship between the optical axis of the projector 120 and the pupil 150 that is imagined. Thereby, for example, the reflection angle of the light can be adjusted. The reflector 130 has a Fresnel configuration formed of the multiple reflective surfaces and the multiple jumps. However, in the embodiment, the reflector 130 is not limited to such a half mirror. Normal half mirrors may be used as the reflector 130; and other members that can similarly adjust the reflection angle may be used. Although an example is described in which the reflectance and the transmittance of the half mirror are the same, the embodiment is not limited to the example in which the reflectance and the transmittance are the same. Any material may be used as the reflective surface as long as the material transmits a portion of the light incident on the reflective surface and reflects another portion of the light.

In the example, the image is displayed as a virtual image. However, the reflector 130 may display the image as a real image distal to the pupil 150.

In the example, the image 171 is displayed in front of the pupil 150. However, the image may be displayed like an image 170 at the edge of the visual field of the viewer 80. Thereby, the visual field of the viewer 80 is not obstructed.

The display device 100 is an eyeglasses-type display device.

The holder 320 is, for example, an eyeglasses frame (a temple). The display device 100 is mountable to the head of the viewer 80 by the holder 320.

The display device 100 further includes eyeglasses lenses 160. In the example, the holder 320 further includes a nose pad 321 and a bridge 322. The bridge 322 connects one of the eyeglasses lenses 160 to the other eyeglasses lens 160. Rims of the eyeglasses lens 160 (frames that hold the eyeglasses lenses 160), etc., may be provided as necessary. Although a configuration is described in the application that is similar to normal corrective eyeglasses, a configuration in which the left and right lenses are combined in a single body may be used.

For example, the relative arrangement of the nose pad 321 and the eyeglasses lenses 160 is fixed. The reflectors 130 are contained in the eyeglasses lenses 160 (are provided as single bodies with the eyeglasses lenses 160). In other words, combiner integrated-type eyeglasses lenses 160 are used; and the relative positional relationships of the reflectors 130 and the eyeglasses lenses 160 are fixed.

The eyeglasses lens 160 has a first surface 161 and a second surface 162. The second surface 162 is separated from the first surface 161. The reflector 130 is provided between the first surface 161 and the second surface 162.

The position of the reflector 130 is not limited to that recited above; and, for example, a configuration may be used in which the reflector 130 is disposed on the second surface 162.

The eyeglasses lens 160 (the reflector 130) is held by the holder 320. For example, similarly to a normal eyeglasses frame, the angle between the holder 320 and the eyeglasses lens 160 may be changeable. The projection unit 125 is held by the holder 320 with a position controller 126 interposed. The position controller 126 is fixed to the holder 320. The relative arrangement of the projection unit 125 and the reflector 130 is changeable by the position controller 126.

The viewer 80 places the nose pad 321 on the nose and one end 320e of the holder 320 on an ear when using the display device 100. Thus, the position of the holder 320 and the relative position of the eyeglasses lens 160 (and the reflector 130) are regulated according to the positions of the nose and the ear of the viewer 80. The relative arrangement of the reflector 130 with respect to the holder 320 is substantially fixed when using the display device 100. Although the position of the pupil 150 with respect to the reflector 130 moves according to the eyeball movement, the pupil position when viewing the image 171 satisfies a relationship within a constant range. This range is called the eye range and is a circular region having a diameter of about several mm. Also, by using the adjustment mechanism of the position controller 126 described below, the viewer 80 can view the screen without missing pieces by adjusting the line of sight to be contained inside the eye range.

In such an eyeglasses-type display device, the position of the reflector 130 with respect to the position of the eye is determined according to the arrangement of the ear, nose, and eye of the viewer. For example, the position of the reflector 130 with respect to the eye is different between users (viewers) of the display device. Therefore, for a different viewer, the position of the image viewed by the viewer changes; and there are cases where the image is not displayed at the appropriate position.

Conversely, in the display device 100, the position of the projection unit 125 can be adjusted by using the position controller 126. Thereby, the position of the image viewed by the viewer can be adjusted appropriately.

It is favorable for the projection unit 125 to be disposed on the inner side of the frame when the viewer 80 wears the holder 320. In other words, it is favorable for the projection unit 125 to be disposed between the viewer 80 and the holder 320 when the display device 100 is used (worn). Thereby, the viewer can use the display device 100 as normal eyeglasses; and discomfort can be reduced when using the display device.

A binocular head mounted display (HMD) that uses two display devices 100 is shown in FIG. 1. One of the display devices displays an image to the right eye of the viewer 80; and the other display device displays an image to the left eye. The embodiment may be a monocular HMD that displays an image to one eye using one display device 100.

In the example, the circuit units 140 are provided respectively for the display devices 100. In the case where the two display devices 100 are used, the circuit units 140 may be integrated to the extent of feasibility.

In FIG. 1, the direction in which the holder 320 extends is taken as a Y-axis direction. One direction perpendicular to the Y-axis direction is taken as an X-axis direction. A direction perpendicular to the X-axis direction and perpendicular to the Y-axis direction is taken as a Z-axis direction. For example, the X-axis direction corresponds to the left and right direction (the horizontal direction) of the viewer 80;

the Y-axis direction corresponds to the frontward and rearward direction of the viewer 80; and the Z-axis direction corresponds to the vertical direction (the upright direction) of the viewer 80. Although the holder 320 has a side extending in a straight line configuration in the Y-axis direction in FIG. 1, the embodiment also includes the case where the configuration of the holder 320 has a gradual bend. The configuration of the holder 320 is modified appropriately by considering the designability and the convenience when using.

Figure 2A:
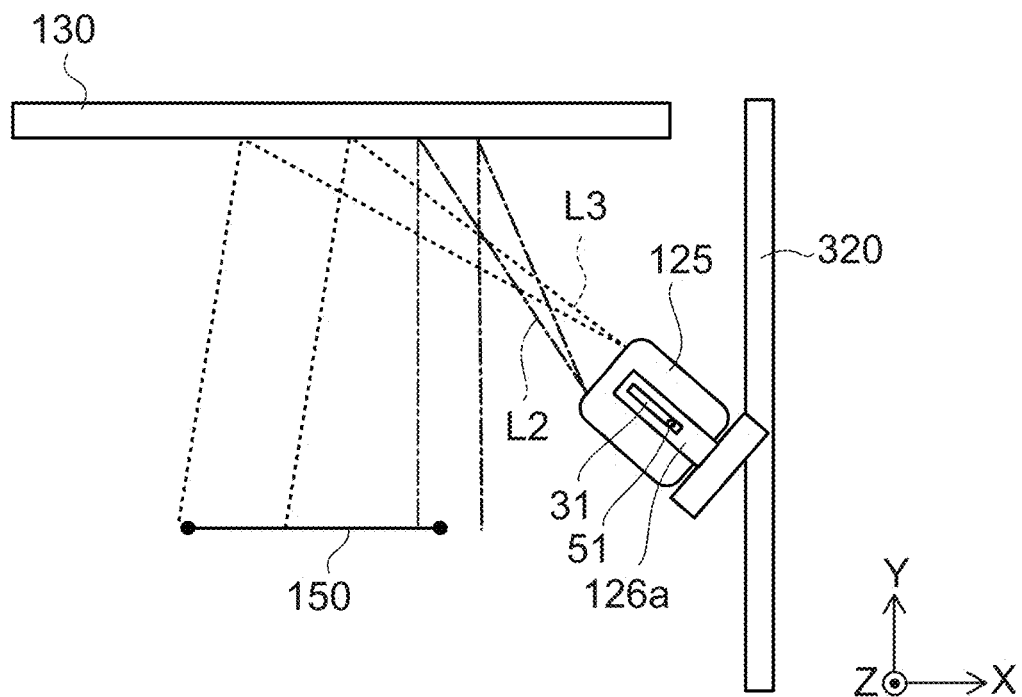
FIG. 2A and FIG. 2B are schematic views illustrating the display device according to the first embodiment.
Figure 2B:
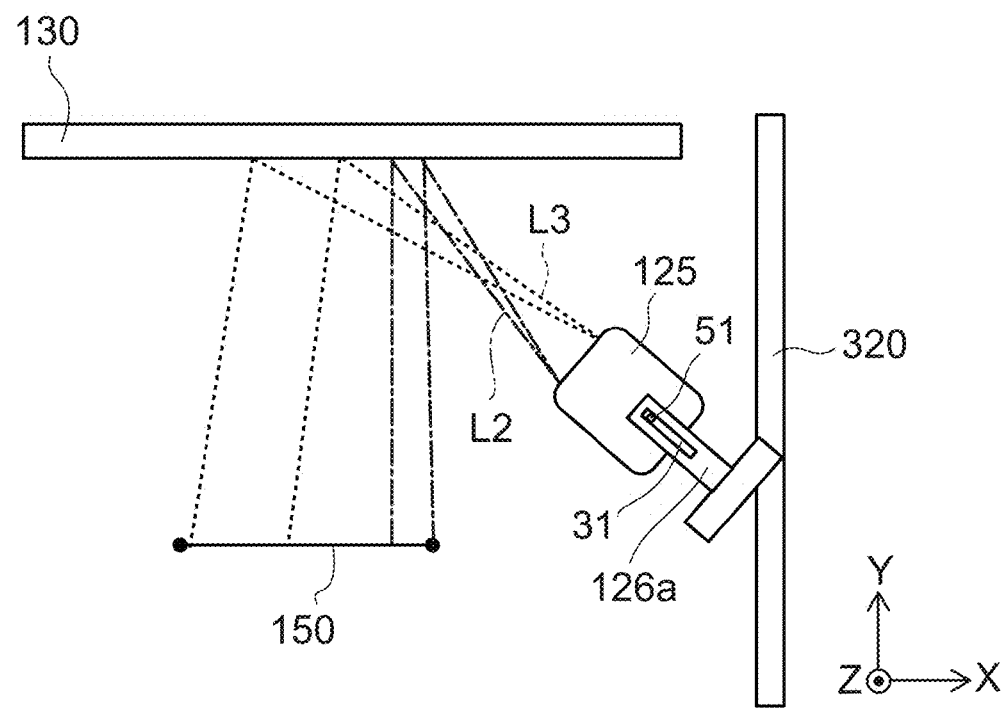

FIG. 2A and FIG. 2B are schematic views illustrating the display device according to the first embodiment.

In FIG. 2A and FIG. 2B, a position controller 126*a* is used as an example of the position controller 126.

In the example shown in FIG. 2A and FIG. 2B, the distance between the projection unit 125 and the reflector 130 is changeable by the position controller 126*a*. For example, the distance along the optical axis of the optical unit 120 is changeable.

In the example, a long hole 31 is provided in the position controller 126*a* along the optical axis of the optical unit 120. A movable shaft 51 is provided in the projection unit 125. The movable shaft 51 is fixed to the projection unit 125. The movable shaft 51 passes through the long hole 31 and can move by sliding through the long hole 31. Thereby, the position of the projection unit can be adjusted.

FIG. 2A shows the state in which the distance between the projection unit 125 and the reflector 130 is long; and FIG. 2B shows the state in which the distance between the projection unit 125 and the reflector 130 is short.

FIG. 2A and FIG. 2B show the optical path of light L2 emitted from one edge of the projection unit 125 and the optical path of light L3 emitted from another edge of the projection unit 125.

In the example of FIG. 2A, the light L3 is reflected by the reflector 130 and is incident on the pupil 150.

On the other hand, a portion of the light L2 that is reflected by the reflector 130 is not incident on the pupil 150. Therefore, for example, the viewer cannot view the right edge of the image.

Conversely, as in FIG. 2B, the distance between the reflector 130 and the projection unit 125 is shortened. Thereby, the spreading at the reflector 130 of the light L2 is suppressed. The correct virtual image can be viewed because the light that is emitted from the edge of the projection unit is incident on the pupil.

Figure 3A:
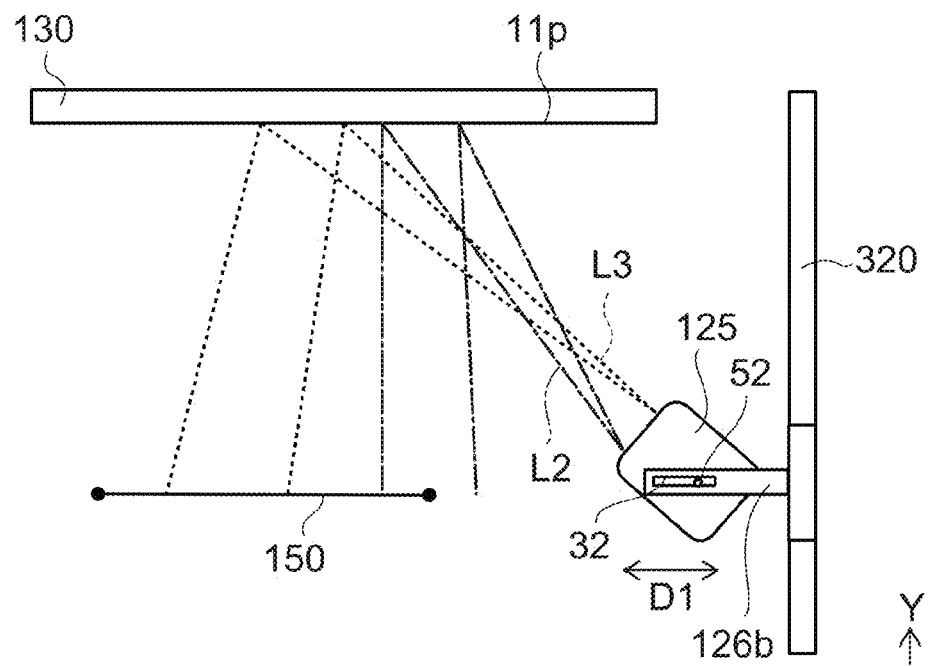
FIG. 3A and FIG. 3B are schematic views illustrating the display device according to the first embodiment.
Figure 3B:
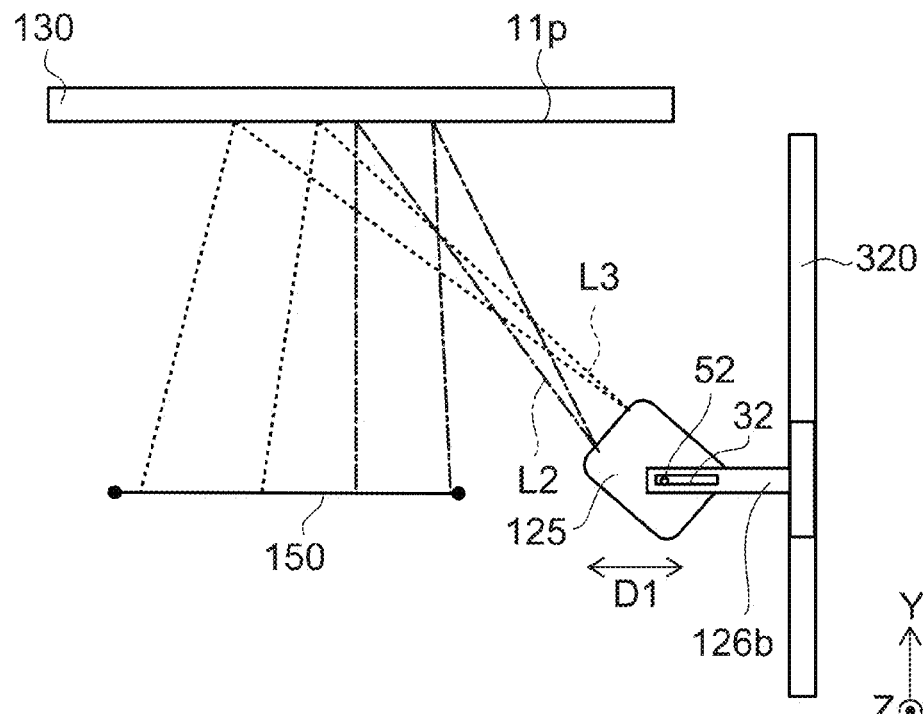

FIG. 3A and FIG. 3B are schematic views illustrating the display device according to the first embodiment.

In FIG. 3A and FIG. 3B, a position controller 126*b* is used as an example of the position controller 126. In the example shown in FIG. 3A and FIG. 3B, the relative arrangement of the projection unit 125 and the reflector 130 is changeable by the position controller 126*b*.

For example, the reflector 130 is provided along the first surface 11*p*. The disposition of the projection unit 125 is changeable in a first direction D1 along the first surface 11*p*. For example, the first direction D1 is parallel to a plane including the reflection direction (DL2) and the incident direction (e.g., DL1) of the reflector 130 of the light emitted from the projection unit 125 (the display unit 110). In the example, the first direction is parallel to the X-axis direction. The relative arrangement of the projection unit 125 and the reflector 130 is changeable in the left and right direction of the viewer.

A long hole 32 is provided in the position controller 126*b* along the X-axis direction. A movable shaft 52 that is fixed to the projection unit 125 passes through the long hole 32 and can moved by sliding through the long hole 32. Thereby, the position of the projection unit 125 can be adjusted in the left and right direction of the viewer 80.

FIG. 3A shows the state in which the projection unit 125 is disposed on the right side; and FIG. 3B shows the state in which the projection unit 125 is disposed on the left side. For example, the distance between the projection unit 125 and the holder 320 in FIG. 3A is shorter than the distance between the projection unit 125 and the holder 320 in FIG. 3B.

In the example as shown in FIG. 3A, a portion of the light L2 emitted from the projection unit 125 is not incident on the pupil 150. Therefore, for example, the viewer cannot view the right edge of the image.

Conversely, as in FIG. 3B, the projection unit 125 is moved to the left side. Thereby, the light L2 is incident on the pupil 150. The correct virtual image can be viewed because the light that is emitted from the edge of the projection unit is incident on the pupil. The image as viewed by the viewer moves in the left and right direction according to the movement of the projection unit 125 in the left and right direction.

Figure 4A:
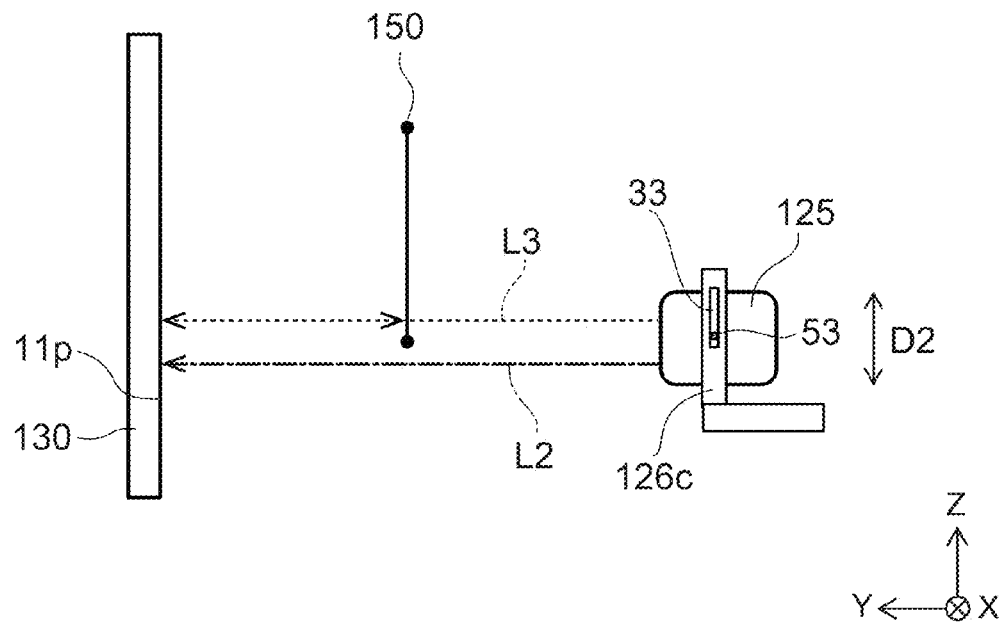
FIG. 4A and FIG. 4B are schematic views illustrating the display device according to the first embodiment.
Figure 4B:
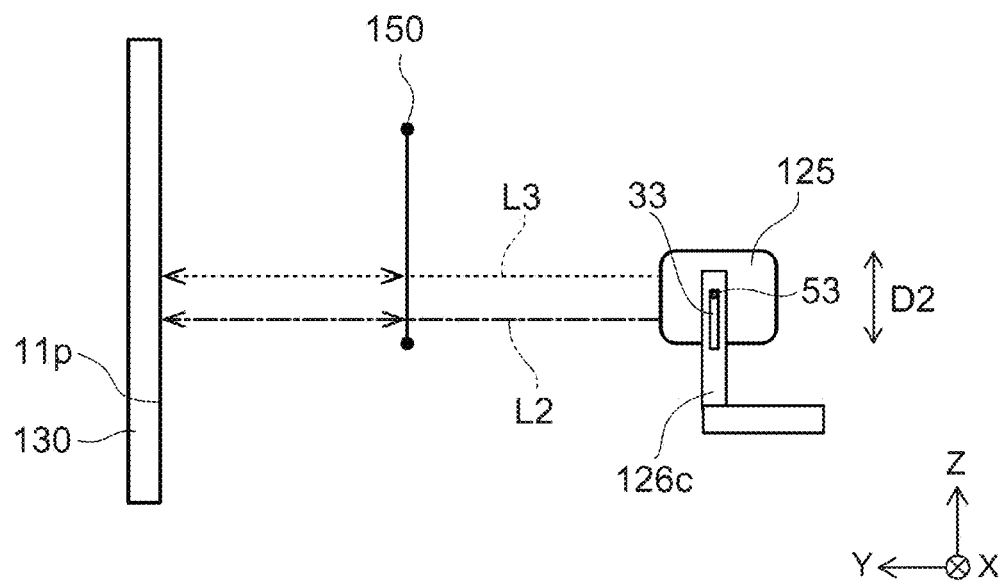

FIG. 4A and FIG. 4B are schematic views illustrating the display device according to the first embodiment. FIG. 4A and FIG. 4B are side views as viewed from the horizontal direction of the viewer 80.

In FIG. 4A and FIG. 4B, a position controller 126*c* is used as an example of the position controller 126. In the example shown in FIG. 4A and FIG. 4B, the relative arrangement of the projection unit 125 and the reflector 130 is changeable by the position controller 126*c*.

For example, the reflector 130 is provided along the first surface 11*p*. The disposition of the projection unit 125 is changeable in a second direction D2 along the first surface 11*p*. The second direction D2 is perpendicular to the first direction D1 described in regard to FIG. 3A. In the example, the second direction D2 is parallel to the Z-axis direction. The relative arrangement of the projection unit 125 and the reflector 130 is changeable in the vertical direction of the viewer.

A long hole 33 is provided in the position controller 126*c* along the Z-axis direction. A movable shaft 53 that is fixed to the projection unit 125 passes through the long hole 33 and can move by sliding through the long hole 33. Thereby, the position of the projection unit 125 can be adjusted in the vertical direction of the viewer 80.

FIG. 4A shows the state in which the projection unit 125 is disposed on the lower side; and FIG. 4B shows the state in which the projection unit 125 is disposed on the upper side.

In the example as shown in FIG. 4A, a portion of the light L2 emitted from the projection unit 125 is not incident on the pupil 150. Therefore, for example, the viewer cannot view the lower end of the image.

Conversely, as in FIG. 4B, the projection unit 125 is moved to the upper side. Thereby, the light L2 is incident on the pupil 150. The correct virtual image can be viewed because the light that is emitted from the edge of the projection unit is incident on the pupil. The image as viewed by the viewer moves in the vertical direction according to the movement of the projection unit 125 in the vertical direction.

Figure 5A:
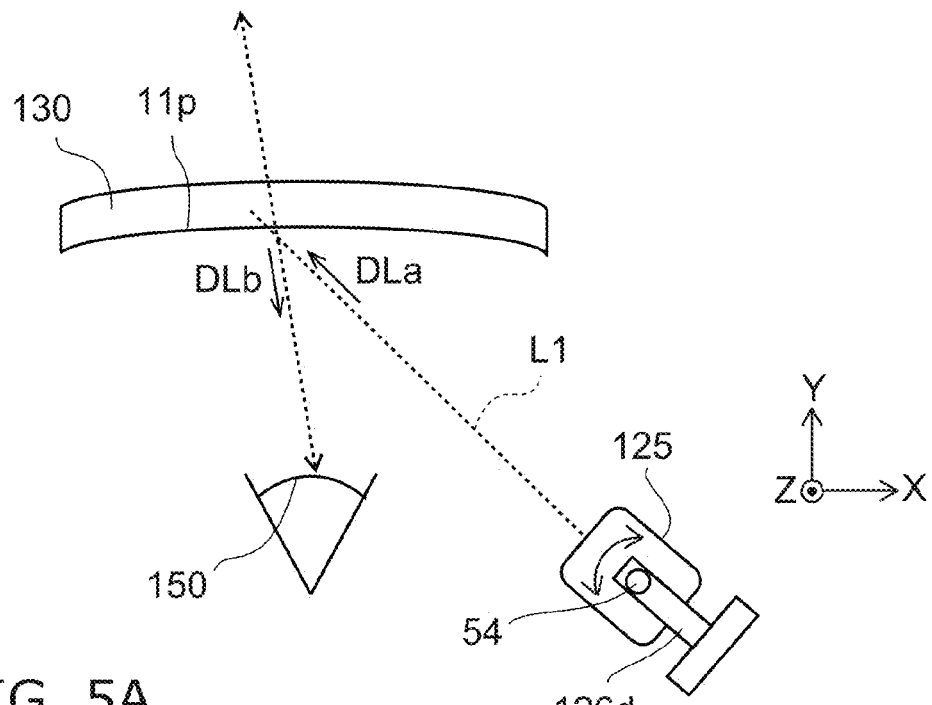
FIG. 5A and FIG. 5B are schematic views illustrating the display device according to the first embodiment.
Figure 5B:
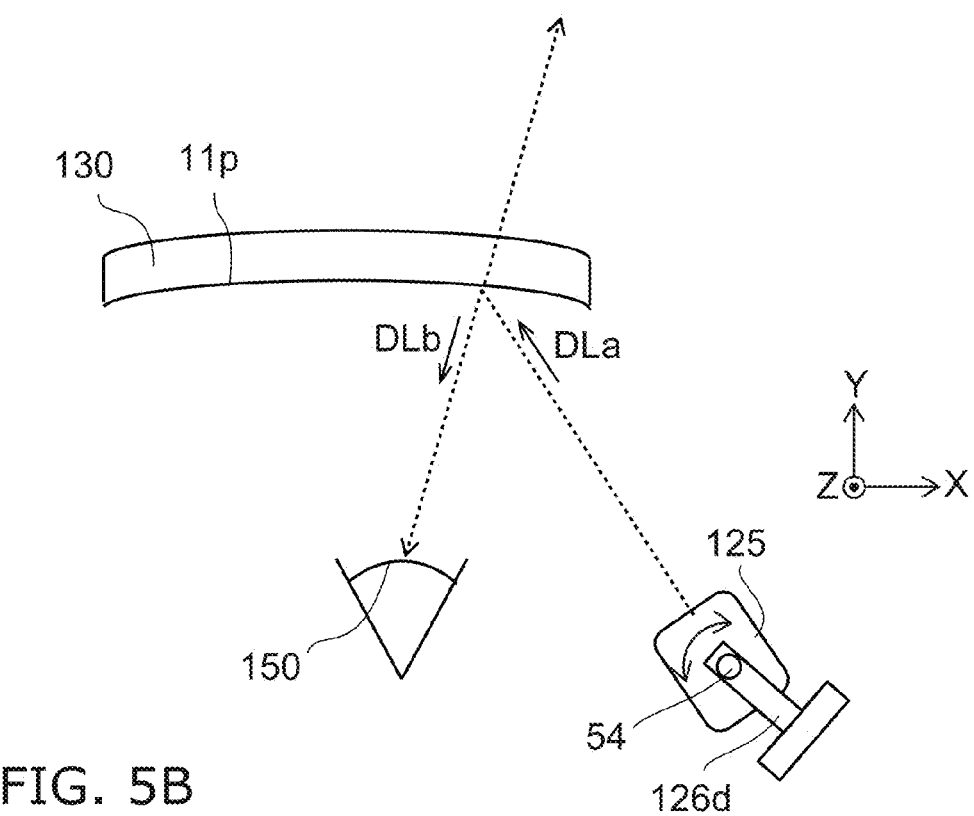

FIG. 5A and FIG. 5B are schematic views illustrating the display device according to the first embodiment. In FIG. 5A and FIG. 5B, a position controller 126*d* is used as an example of the position controller 126. The relative arrangement of the projection unit 125 and the reflector 130 is changeable by the position controller 126d.

For example, the optical unit 120 has an optical axis 120a. The angle between the optical axis 120a and the first surface 11p is changeable by the position controller 126d. In other words, an incident direction DLa at the reflector 130 of the light L1 including the image information is changeable by the position controller 126d.

In the example, the position controller 126d includes a rotation shaft 54. The projection unit 125 is held by the rotation shaft 54. The projection unit 125 can be rotated around the rotation shaft 54. For example, the projection unit 125 can be rotated in the X-Y plane.

FIG. 5A shows the state in which the incident angle of the light L1 on the reflector 130 is large; and FIG. 5B shows the state in which the incident angle of the light L1 on the reflector 130 is small.

Thus, the incident direction DLa and a reflection direction DLb of the light L1 at the reflector 130 can be adjusted by rotating the projection unit 125. Thereby, the direction in which the image is viewed can be adjusted.

Figure 6A:
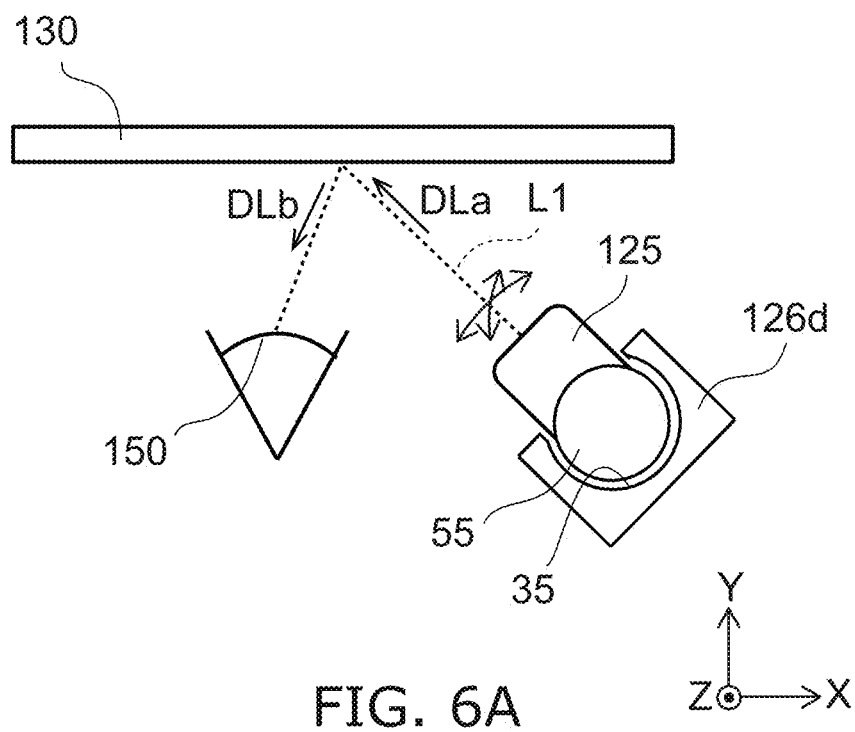
FIG. 6A and FIG. 6B are schematic views illustrating position controllers.
Figure 6B:
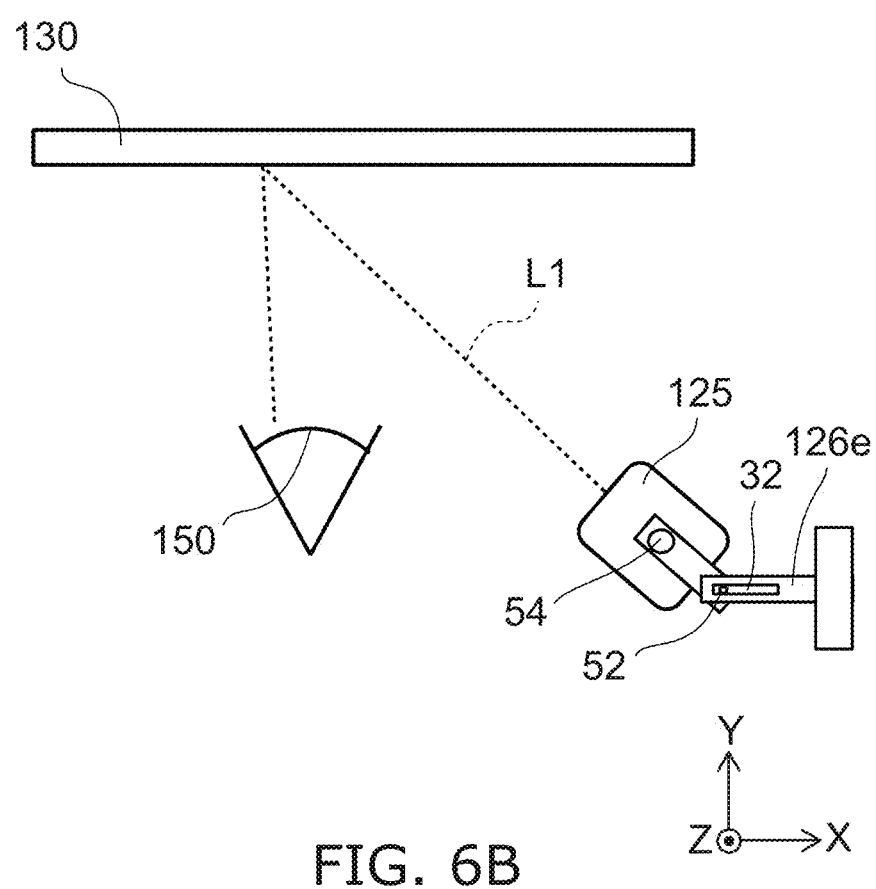

FIG. 6A and FIG. 6B are schematic views illustrating position controllers.

In the example shown in FIG. 6A, the incident direction DLa at the reflector 130 of the light L1 including the image information is changeable by a position controller 126d. A mounting unit 55 is provided in the projection unit 125. For example, the mounting unit 55 has a partial spherical configuration. An opening 35 is provided in the position controller 126d. For example, the opening 35 covers at least a portion of the mounting unit 55. The mounting unit 55 is held by the position controller 126d; and the mounting unit 55 can be rotated inside the opening 35. Thereby, the direction in which the image is viewed can be adjusted by rotating the projection unit 125 in the vertical direction and the left and right direction.

For example, in a method of a reference example, the position of the virtual image is adjusted by modifying the position of the reflector 130 without modifying the disposition of the projection unit 125. However, when using an eyeglasses-type display device, the relative arrangement of the eyeglasses frame and the eyeglasses lens (the reflector 130) is substantially fixed. Therefore, as described above, the relative arrangement of the reflector 130 and the pupil 150 of the viewer is substantially fixed; and there are cases where it is difficult to modify the position of the reflector 130. Conversely, in the embodiment, the disposition of the projection unit 125 is modified by the position controller 126. Thereby, for example, the degrees of freedom are increased by adjusting the relative arrangement of the reflector 130 and the projection unit 125.

The mechanism of the position controller 126 described above is an example; and the embodiment includes any form that can similarly adjust the position of the projection unit. Further, the mechanism of the position controller 126 described above may be multiply combined. For example, a position controller 126e shown in FIG. 6B is an example in which a rotation mechanism in the X-Y plane is combined with a position adjustment mechanism in the left and right direction. In the embodiment, the mechanisms and the number of mechanisms used in combination are arbitrary. Thereby, an easily-viewable display can be obtained in which the projection unit 125 is disposed at the appropriate position and the position of the image can be adjusted.

Second Embodiment

Figure 7:
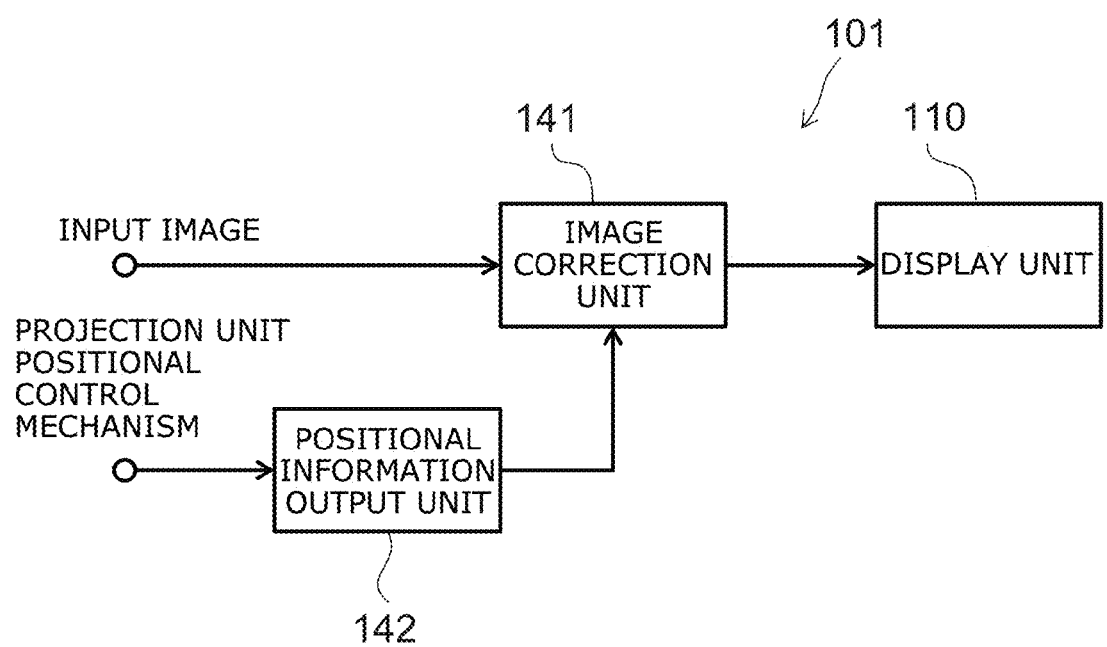
FIG. 7 is a block diagram illustrating a display device according to a second embodiment.

FIG. 7 is a block diagram illustrating a display device according to a second embodiment.

Similarly to the display device 100, the projection unit 125, the reflector 130, the circuit unit 140, the holder 320, etc., are provided in the display device 101 as well.

As shown in FIG. 7, the display device 101 includes an image correction unit 141 and a positional information output unit 142. For example, the image correction unit 141 and the positional information output unit 142 are embedded in the circuit unit 140.

The positional information output unit 142 detects positional information relating to the relative arrangement of the projection unit 125 and the reflector 130 and outputs the positional information to the image correction unit 141. Any sensor such as a potentiometer, etc., may be used to detect the positional information. For example, the sensor is provided in the projection unit 125 or the position controller 126. For example, the relative arrangement of the projection unit 125 and the reflector 130 can be adjusted by a stepless adjustment.

The position controller 126 may include a mechanical mechanism that adjusts the position of the projection unit 125 in steps. For example, the position of the projection unit 125 is adjusted in steps by providing a scale such as a dial, etc., that shows the positional information. The positional information output unit 142 outputs information corresponding to the value of the scale to the image correction unit 141.

The image correction unit 141 generates the image information by correcting the input image (the object image) based on the positional information relating to the relative arrangement of the projection unit 125 and the reflector 130. The display unit 110 emits the light based on the image information that is corrected. Thereby, for example, the appropriate image can be displayed.

The information that is output by the positional information output unit 142 may be based on information input by the viewer 80. For example, the viewer 80 inputs information (e.g., the value of a scale, etc.) indicating the position of the projection unit 125 to the display device 101. Thereby, for example, the correction of the image correction unit 141 can be modified by the viewer 80. For example, software (an application) is installed in a computer or a portable terminal; and the information is input from the viewer 80 to the circuit unit 140 via the computer, the portable terminal, etc. The positional information may be directly input to the circuit unit 140.

FIG. 8A to FIG. 8D are schematic views illustrating an operation of the display device.

Figure 8A:
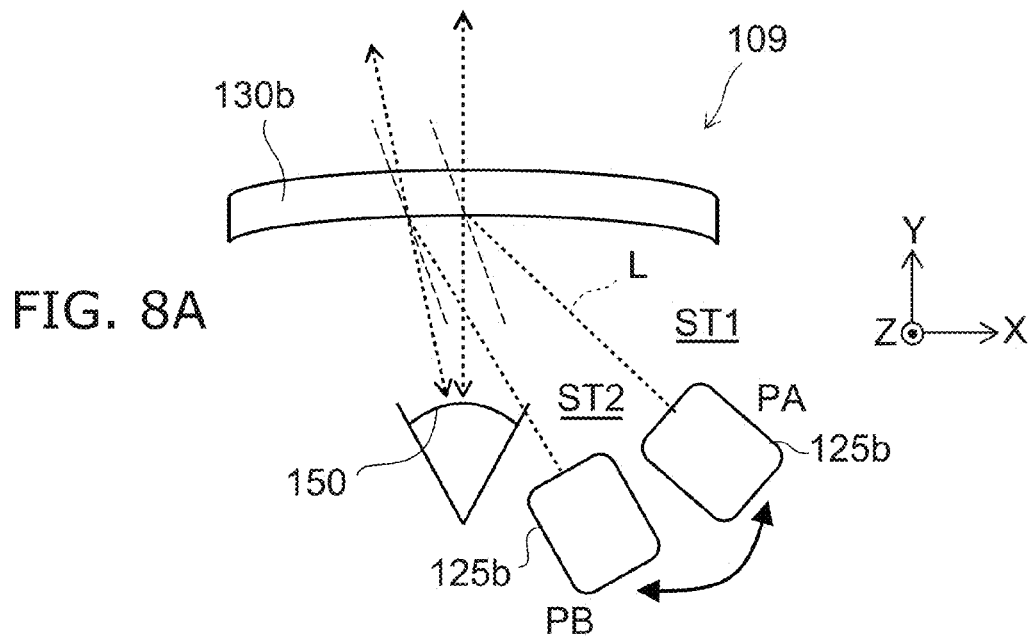
FIG. 8A to FIG. 8D are schematic views illustrating an operation of the display device.

FIG. 8A shows a display device 109 of a reference example. The display device 109 of the reference example includes a reflector 130b and a projection unit 125b. A configuration similar to that of the reflector 130 is applicable to the reflector 130b; and a configuration similar to that of the projection unit 125 is applicable to the projection unit 125b. The image correction unit 141 is not provided in the display device 109.

FIG. 8A shows a first state ST1 in which the projection unit 125b is disposed at a position PA, and a second state ST2 in which the projection unit 125b is disposed at a position PB. For example, for the incident angle at the reflector 130 of the light emitted from the projection unit 125b, the incident angle in the first state ST1 is larger than the incident angle in the second state. The distance between the projection unit 125b and the reflector 130 in the first state ST1 is shorter than the distance between the projection unit 125b and the reflector 130 in the second state ST2.

In the eyeglasses-type display device, the light that includes the image information is projected obliquely with respect to the reflector. For example, the incident angle at the reflector of the light emitted from the projection unit is relatively large. As described above, multiple pixels are arranged on a plane in the display unit. Therefore, the optical path length to the pupil 150 is different between the positions where the pixels are provided on the display unit. Thereby, in the eyeglasses-type display device, there are cases where aberration occurs and distortion of the displayed image occurs.

The multiple pixels that are provided in the display unit include, for example, a pixel that emits red light, a pixel that emits green light, and a pixel that emits blue light. Thereby, a color image can be displayed. In such a case, there are cases where chromatic aberration occurs due to the optical system of the optical unit (the projector). For example, the magnitude (the level) of the chromatic aberration is dependent on the incident angle at the reflector of the light emitted from the projection unit.

Figure 8B:
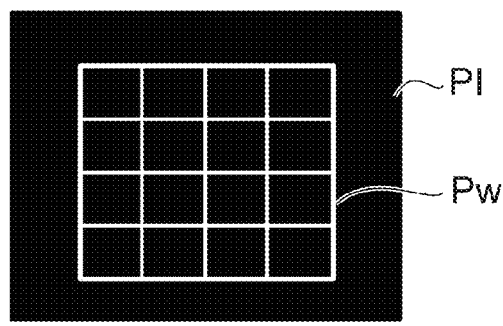
Figure 8C:
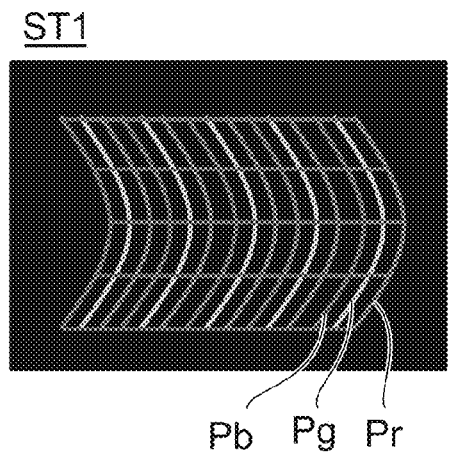
Figure 8D:
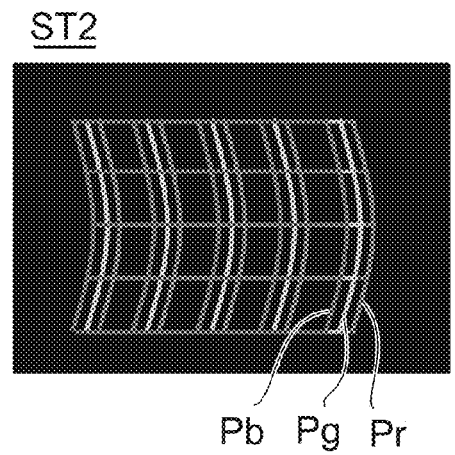

FIG. 8B is an example of an image PI displayed by the display unit of the display device 109. The image PI is the image of a white lattice pattern Pw. FIG. 8C is an example of the virtual image in the first state ST1 in the case where the image PI is displayed by the display unit. FIG. 8D is an example of the virtual image in the second state ST2 in the case where the image PI is displayed by the display unit.

As shown in FIG. 8C and FIG. 8D, the configuration of the virtual image that is displayed is distorted with respect to the image PI.

For example, a white line is displayed by overlaying red light, blue light, and green light. In the virtual images of FIG. 8C and FIG. 8D, the positions of an image Pr of the red light, an image Pb of the blue light, and an image Pg of the green light are different from each other; and the white lines are not displayed appropriately.

Compared to the second state ST2, the distortion of the virtual image is large and the effect (the color breakup) of the chromatic aberration is large in the first state ST1 in which the incident angle is large. Thus, distortion and the like occur in the displayed image according to the relative arrangement of the projection unit and the reflector.

Conversely, in the display device 101 according to the embodiment, the input image is corrected by the image correction unit 141 to suppress the effects of such aberration. Thereby, the distortion and the like of the image are small; and an easily-viewable virtual image can be displayed.

Figure 9:
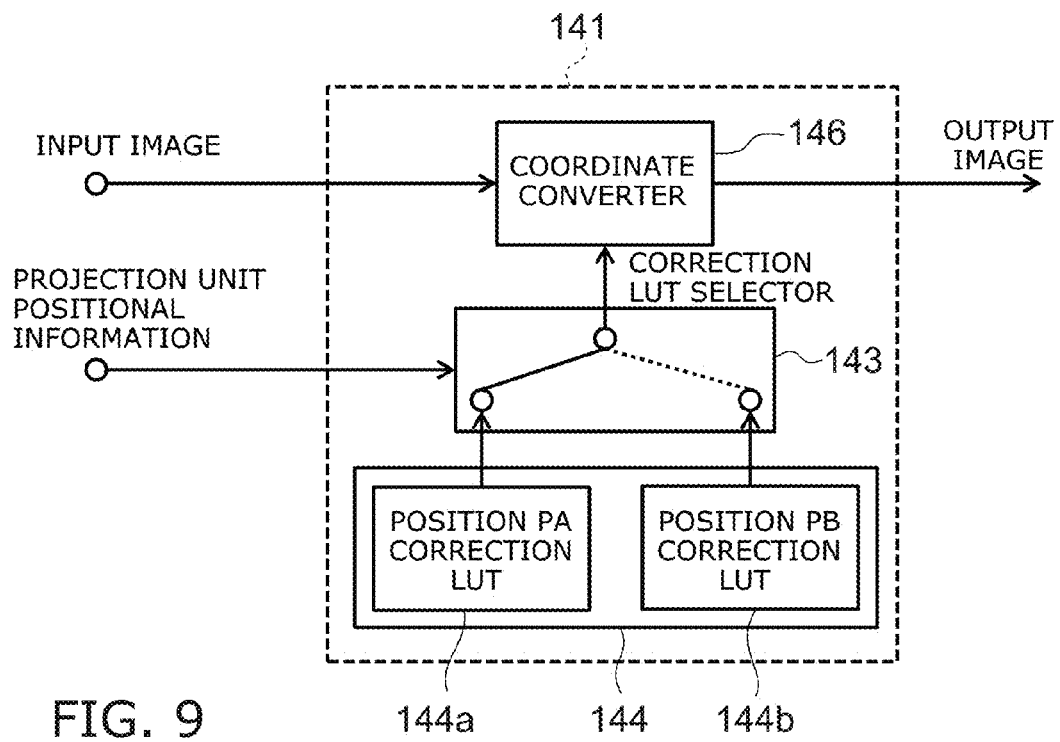
FIG. 9 is a block diagram illustrating the image correction unit.

FIG. 9 is a block diagram illustrating the image correction unit.

As shown in FIG. 9, the image correction unit 141 includes a coordinate converter 146 (a converter) and a correction LUT selector 143 (a selector).

In the example, the image correction unit 141 further includes a LUT storage unit 144. The LUT storage unit 144 stores a lookup table (LUT). For example, multiple correction coefficients (e.g., a matrix) for performing the correction of the image correction unit 141 are pre-stored in the LUT. Each of the multiple correction coefficients is predetermined based on the relative arrangement of the projection unit 125 and the reflector 130. For example, coefficients 144*a* (a position PA correction LUT) for the case where the projection unit 125 is disposed at the position PA, coefficients 144*b* (a position PB correction LUT) for the case where the projection unit 125 is disposed at the position PB, etc., are stored.

The correction LUT selector 143 acquires the positional information relating to the relative arrangement of the projection unit 125 and the reflector 130 from the positional information output unit 142. The correction LUT selector 143 selects the correction coefficient according to the acquired positional information.

The coordinate converter 146 corrects the input image using the correction coefficient selected by the correction LUT selector 143. For example, an image is generated by converting the coordinates of each pixel of the input image by multiplying the input image by the correction coefficient. Thus, the display unit 110 displays the image information that is converted (corrected). Thereby, a virtual image can be displayed in which the effects of the aberration according to the relative arrangement of the projection unit 125 and the reflector 130 is suppressed.

The block diagram shown in FIG. 7 and FIG. 9 is an example and does not necessarily match the actual module. For example, a portion (e.g., the LUT storage unit 144 or the like) of each block may be provided separately from the display device.

Figure 10:
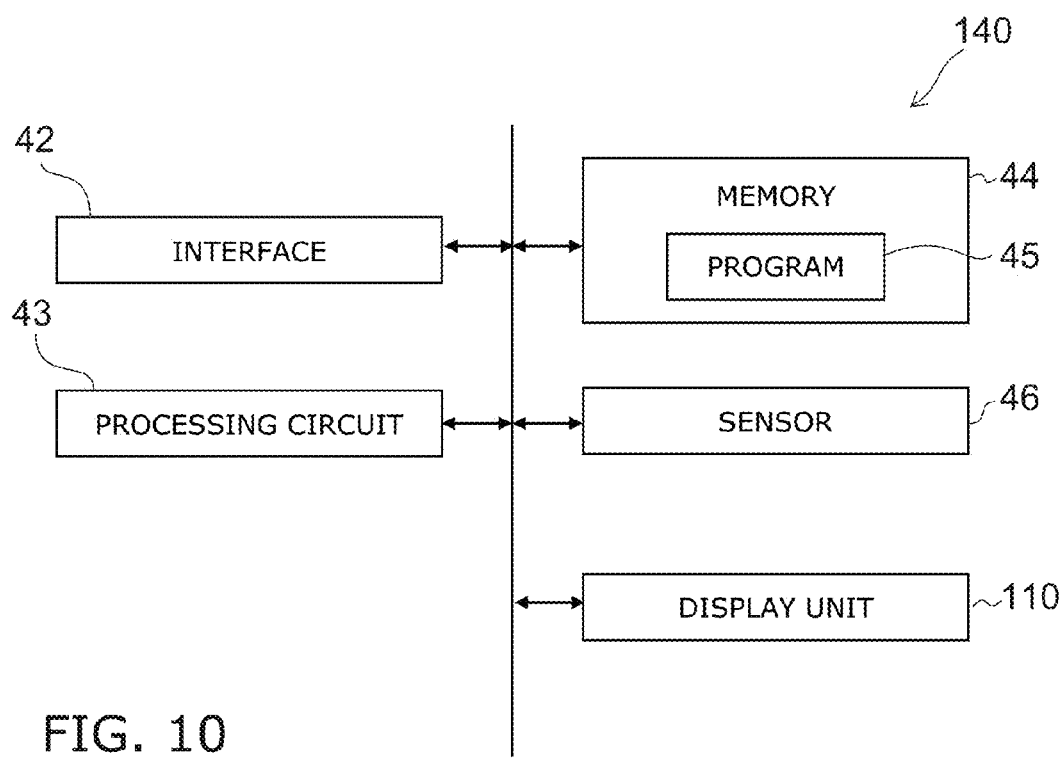
FIG. 10 is a schematic view illustrating the display device according to the embodiment.

FIG. 10 is a schematic view illustrating the display device according to the embodiment.

FIG. 10 shows an example of the system configuration of the display device according to the embodiment.

As shown in FIG. 10, the circuit unit 140 includes, for example, an interface 42, a processing circuit (a processor) 43, and memory 44.

For example, the circuit unit 140 acquires the input image by being connected to an external storage medium and/or a network via the interface 42. A wired or wireless method may be used for the external connection.

For example, a program 45 that processes the acquired input image is stored in the memory 44. For example, the input image is appropriately converted based on the program 45; and thereby, an appropriate display is performed in the display unit 110. The image information may be stored in the memory 44. The program 45 may be provided in the state of being pre-stored in the memory 44, may be provided via a network and/or a storage medium such as CD-ROM, etc., or may be appropriately installed.

The circuit unit 140 may include a sensor 46. The sensor 46 may include, for example, any sensor such as a camera, a microphone, a positional sensor, an acceleration sensor, etc. For example, the image that is displayed by the display unit 110 is modified appropriately based on the information obtained from the sensor 46. Thereby, the convenience and ease of viewing of the display device can be improved.

For example, the image information, the information obtained from the sensor 46, etc., are processed based on the program 45 by the processing circuit 43.

Thus, the obtained image information is input to the display unit 110 from the circuit unit 140; and the display is performed by the display device.

For example, the positional information relating to the relative arrangement of the projection unit 125 and the reflector 130 is detected by the sensor 46. For example, the LUT that is used in the correction of the image correction unit 141 is stored in the memory 44. For example, the processing of the correction LUT selector 143 and/or the coordinate converter 146 is performed by the processing circuit 43 based on the program 45.

The example shown in FIG. 10 is an example of the display device according to the embodiment and does not necessarily match the actual module.

A portion of each block or each entire block of the circuit unit 140 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as a single body; or some blocks may be provided separately. Also, for each block, a portion of the block may be provided separately. The integration is not limited to LSI; and a dedicated circuit or a general-purpose processor may be used.

According to the embodiments, an easily-viewable display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the display unit, the optical unit, the projection unit, the reflector, the eyeglasses lens, the position controller, the positional information output unit, the image correction unit, the circuit unit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
    an image correction unit to generate a first image information signal of an object image and a second image information signal of the object image, the second image information signal being different from the first image information signal;
    a projection unit to emit a first light based on the first image information signal supplied from the image correction unit and a second light based on the second image information signal supplied from the image correction unit, the projection unit being held by a holder; and
    a reflector to reflect at least a portion of the first light emitted from the projection unit and at least a portion of the second light emitted from the projection unit, the reflector being held by the holder,
    wherein the image correction unit generates the first image information signal of the object image when the projection unit and the reflector are in a first relative arrangement and generates the second image information signal of the object image when the projection unit and the reflector are in a second relative arrangement, the first relative arrangement of the projection unit and the reflector is different from the second relative arrangement of the projection unit and the reflector.

2. The device according to claim 1, wherein a distance between the projection unit and the reflector is changeable.

3. The device according to claim 1, wherein an incident direction of the first light is different from an incident direction of the second light.

4. The device according to claim 1, wherein
    the reflector has a first surface, and
    a position of the projection unit with respect to the reflector is changeable in a first direction along the first surface.

5. The device according to claim 4, wherein the position of the projection unit with respect to the reflector is changeable in a second direction along the first surface, the second direction being perpendicular to the first direction.

6. The device according to claim 4, wherein the first direction is parallel to a plane including an incident direction of the first light at the reflector and a reflection direction of the first light at the reflector.

7. The device according to claim 5, wherein the second direction is perpendicular to a plane including an incident direction of the first light at the reflector and a reflection direction of the first light at the reflector.

8. The device according to claim 1, further comprising a positional information output unit to detect the first relative arrangement of the projection unit and the reflector and to output a positional information based on the first relative arrangement of the projection unit and the reflector to the image correction unit.

9. The device according to claim 8, wherein
    the image correction unit includes:
    a selector to select a correction coefficient corresponding to the positional information from a plurality of correction coefficients based on the first relative arrangement of the projection unit and the reflector, the correction coefficients being predetermined; and
    a converter to correct the object image using the selected correction coefficient.

10. The device according to claim 1, wherein the device is mountable to a head of a viewer.

11. The device according to claim 1, further comprising an eyeglasses lens,
    the reflector being formed as a single body with the eyeglasses lens.

12. The device according to claim 10, wherein the projection unit is disposed between the head and the holder when mounted.

13. The device according to claim 1, wherein
    the projection unit includes a display unit and an optical unit,
    the display unit emits the first light and the second light,
    the optical unit is provided between the display unit and the reflector in an optical path of the first light and an optical path of the second light, and
    a relative arrangement of the optical unit and the display unit is fixed.

14. The device according to claim 13, wherein a distance along an optical axis of the optical unit between the projection unit and the reflector is changeable.

15. The device according to claim 13, wherein the optical unit includes at least one of a lens, a prism, or a mirror.

16. The device according to claim 1, further comprising a circuit unit connected to the projection unit by a cable, the cable being bendable, the projection unit acquiring the first image information signal and the second image information signal from the circuit unit.

17. The device according to claim 1, wherein the reflector includes a plurality of reflective surfaces.

18. The device according to claim 1, wherein a reflective first surface of the reflector reflects a portion of the first light incident on the reflective first surface and transmits another portion of the first light incident on the reflective first surface.

19. The device according to claim 1, further comprising a position controller provided between the holder and the projection unit, wherein the position controller includes a rotation shaft, and
the projection unit rotates around the rotation shaft.

20. The device according to claim 1, further comprising a position controller provided between the holder and the projection unit, wherein the relative arrangement between the projection unit and the reflector is changeable by the position controller, and a position of the reflector with respect to the holder is fixed.

* * * * *